United States Patent [19]

Poque et al.

[11] 4,328,852
[45] May 11, 1982

[54] PNEUMATIC VEHICLE TIRE EMPLOYING CORDS HAVING A SINGLE WIRE FILAMENT CORE AND A MANTLE

[75] Inventors: Dionysius J. Poque, Aachen-Kornelimünster; Georg Freudenstein, Aachen; Horst Lorenz, Stolberg-Büsbach, all of Fed. Rep. of Germany

[73] Assignee: Uniroyal Englebert, Aachen, Fed. Rep. of Germany

[21] Appl. No.: 236,124

[22] Filed: Feb. 19, 1981

[30] Foreign Application Priority Data

Feb. 21, 1980 [DE] Fed. Rep. of Germany ....... 3006488

[51] Int. Cl.³ .......................... B60C 9/20; D07B 1/06
[52] U.S. Cl. .......................... 152/359; 152/361 DM; 152/361 R; 152/361 FP; 156/110 C; 57/217; 57/223; 57/902
[58] Field of Search .......... 152/330 R, 356 R, 357 R, 152/359, 361 R, 361 FP, 361 DM; 156/110 C; 57/205, 213, 217, 223, 228, 236, 241, 902

[56] References Cited

U.S. PATENT DOCUMENTS 3,996,733 12/1976 Holmes ................................. 57/145
4,166,355 9/1979 Gross ................................. 57/212

FOREIGN PATENT DOCUMENTS 2701025 7/1977 Fed. Rep. of Germany .
2648524 3/1978 Fed. Rep. of Germany .

*Primary Examiner*—John E. Kittle
*Assistant Examiner*—Lois E. Boland
*Attorney, Agent, or Firm*—Becker & Becker, Inc.

[57] ABSTRACT

A pneumatic vehicle tire including a carcass, particularly a radial carcass, a tread, and a belt-like reinforcement formed of at least two cord plies radially superimposed one above the other. At least one of the plies has rubberized metallic cord elements, and the other suitably has non-metallic cord elements. The cord elements cross each other from ply to ply, and the width of at least one cord ply is approximately equal to the width of the tread. The metallic cord elements, which particularly are made of brass-plated steel wire, further comprise a core and a mantle of wire, with the mantle including several twisted individual wires of equal size. The metallic cord elements in the cord ply comprise a core of a single wire filament, and a mantle comprising at least three single wire filaments. The mantle wire filaments respectively have a part which radially engages the wire filament of the core. The diameter of the wire filament of the core is smaller than the diameter of the mantle wire filament, which amounts at most to 0.28 mm. The center-to-center distance of adjacent mantle filaments is greater than the diameter of the mantle wire filaments.

8 Claims, 5 Drawing Figures

PNEUMATIC VEHICLE TIRE EMPLOYING CORDS HAVING A SINGLE WIRE FILAMENT CORE AND A MANTLE

The present invention relates to pneumatic vehicle tires which essentially comprise a carcass, particularly a radial carcass, tire beads, sidewalls, a tread strip with a contact surface, and a belt-like reinforcement between the carcass and the tread strip. The belt-like reinforcement is formed of at least two radially superimposed cord plies, at least one of which comprises rubberized metallic cord elements, with the other suitably comprising rubberized non-metallic cord elements. The cord elements of respective plies cross one another, and the width of at least one cord ply is approximately equal to the width of the tread surface. The metallic cord elements, which particularly comprise brass-plated steel wire, further comprise an inner core and a mantle of wire, with the mantle including several single wires which are preferably twisted in common and are of the same size.

These cord elements are located in the cord ply with a predetermined packing density and essentially parallel to each other. The cord elements from the reinforcement of the elastic or easily deformable ply of rubber or rubber-like synthetic materials. The cord elements are embedded in the material surrounding them in such a way that they bond to the surrounding material and deform together therewith. Under such circumstances, however, the cord elements suffer considerable stress. Consequently, the individual cord elements are selected according to dimension and assembly of their component parts of wire in such a way that the cord elements on the one hand are sufficiently yieldable and deformable, and on the other hand have sufficient fatigue strength and compressive stiffness.

The cord elements of wire are furthermore subject to chemical and/or biological influences. The main cause thereof is the air permeability of the tire itself; in particular, air permeability from the interior through normal diffusion, or air permeability from the outside by air flowing in during tire damage. The air penetrating from the outside contains moist components, which penetrate through the rubberizing to the uncovered or only partially covered wire surface, and proceed further through the existing hollow space in the center of each cord element between the wires of the cord mantle, in time filling the interior of every cord element in the longitudinal extension thereof. Since the trapped air which has penetrated so far in contains moist components, and releases oxygen, in time the components contained in the air, and in winter additionally including salt components, have a corrosive effect upon the surface of the cord wires. Such components, under certain circumstances, can bring about the premature destruction of the cord ply by strong rust formation, hence bringing about the destruction of the tire in its entirety.

It has already been proposed to fill the interior of the cord element with corrosion-unsensitive material; or, according to German Offenlegungsschrift No. 27 01 025, it was recommended to provide the cord element with a core of aramid fibers.

According to German Offenlegungsschrift No. 26 48 524, the core of the cord element can also comprise a rubber or thermoplastic strand, or can comprise natural or synthetic fibers twisted together into a fiber bundle. The disadvantage of this known cord element consists in that the necessary strength and compressive stiffness cannot be attained except with the expense of a plurality of mantle wires.

For the purpose of obtaining cord elements having a core with a strength nearly equal to that of the mantle wires, it has also been recommended to include a core wire in the cord element construction. This cord construction did not succeed since, because of the wire construction of the up to now utilized wires, the core wire in wire structures shifts or wanders and protrudes laterally from the tire shoulder. This disadvantage is to be avoided under all circumstances.

Further conventional steel cords, which are disclosed for example by German Offenlegungsschrift No. 27 03 328 (U.S. Pat. No. 3,996,733) comprise a mantle of six or seven steel wires of the same size, an inner core of two cross-sectionally smaller steel wires of the same size relative to each other. Although these cord elements have proven satisfactory, they add to the weight of the belt because of the number of wires used, they are disadvantageous from a cost standpoint, and in the utilization thereof in belt plies they lead to unsatisfactorily high rolling resistance of the pneumatic vehicle tires. The consequence thereof is an unnecessarily high energy consumption. Pneumatic vehicle tires, particularly belted tires, should, with the existing energy shortage, have the smallest possible rolling resistance.

It is therefore an object of the present invention to improve a pneumatic vehicle tire of the initially described type in such a way that by utilizing metallic cord elements having an inner core in the cord ply, the indicated disadvantages do not exist, a very small rolling resistance is attained, whereby the compressive stiffness of the cord elements with low weight is as high as possible, high air tightness of the cord element is reliably attained and maintained, and a high fatigue strength is assured.

This object, and other objects and advantages of the present invention, will appear more clearly from the following specification in connection with the accompanying drawings, in which.

Figure 1:
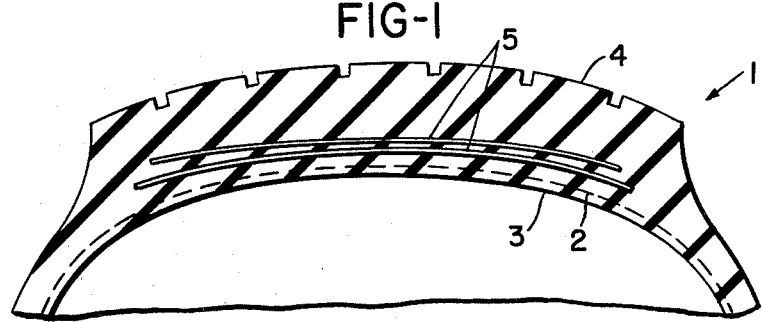
FIG. 1 is a partial section through a pneumatic vehicle tire in accordance with the present invention.

The pneumatic tires of the present invention are characterized primarily in that the metallic cord elements in the cord ply comprise a core of a single wire filament, and a mantle comprising at least three single wire filaments; furthermore, the mantle wire filaments respectively have a part which radially engages the wire filament of the core; furthermore, the diameter of the wire filament of the core is smaller than the diameter of the mantle wire filament, which amounts at most to 0.28 mm; and finally, the center-to-center distance of adjacent mantle filaments is greater than the diameter of the mantle wire filament.

The single wire filament of the inner core of the cord element guarantees a high compressive strength with relatively low weight when three to five single wire filaments of the mantle are provided, and also guarantees sufficiently high strength, particularly fatigue strength, as well as absolute air tightness, even with tire damage from the exterior. Wandering or shifting of the inner core is reliably prevented.

The utilization of such cord elements in at least one belt ply results in a very low rolling resistance, and consequently low energy consumption, with pneumatic vehicle tires of the initially described type. The fatigue strength is considerably improved without encountering significant reduction in wear behavior.

The single wire filament as an inner core reliably fills the hollow space between the mantle wires nearly completely and permanently, in which connection the embedding material, during subsequent treatment, for example between calandering rollers, into cord plies, is optimally pressed into the gaps or spaces between the individual wire filaments of the mantle, thus providing a high and good-bonding covering or coating. These features assure an absolute air impermeability in the cord elements after the polymerization or vulcanization of the rubber or synthetic material components in the pneumatic vehicle tire. This precludes moisture and oxygen of the air, which as a result of external damage or by diffusion from the inside could pass to the cord elements, from bringing about premature destruction of the wires by corrosion, and consequently influencing the entire strength and durability of the pneumatic vehicle tire.

The cord elements can be constructed in such a way that within limits they have a higher or lower compressive strength while simultaneously maintaining their absolute air impermeability. With small cross sections of the wire filament of the inner core, preferably four or five mantle wires of larger wire cross section are arranged in the conventional cord twisting. The wire filament of the inner core can have a cross section which is approximately 1.2 to 2 times smaller than the cross section of the mantle wire filament.

The individual wire filament as the core of a cord element can be embodied in a conventional manner in an essentially linear manner. The individual wire filament as the inner core is advantageously clamped in the cord element center during the twisting or stranding, and is hereafter advantageously surrounded at all accessible locations by coating material during the subsequent treatment into a cord ply. Consequently, during the subsequent vulcanization or polymerization a sufficiently positive binding or adhering effect between the core and the mantle wires is assured. A shifting of the core is consequently precluded. The individual wire filament as the inner core of the cord element can, however, also be embodied with a slightly curved or undulated configuration. In this case, the bulges and valleys provided by way of the wavy or undulated shape of the wire filament, in addition to the previously described arrangement of the wire filament in the center of the cord element, then have a positively improved effect on the binding of the core with the mantle wires.

Referring now to the drawing in detail, the pneumatic vehicle tire 1, in radial construction with a belt-like reinforcement according to FIG. 1, comprises a radial carcass 2 with non-illustrated beads, sidewalls, and a tread surface 4, as well as a reinforcement which is formed of two radially superimposed cord plies 5. At least one of these is a steel cord ply. Reference numeral 3 designates an air impermeable inner layer.

Figure 2:
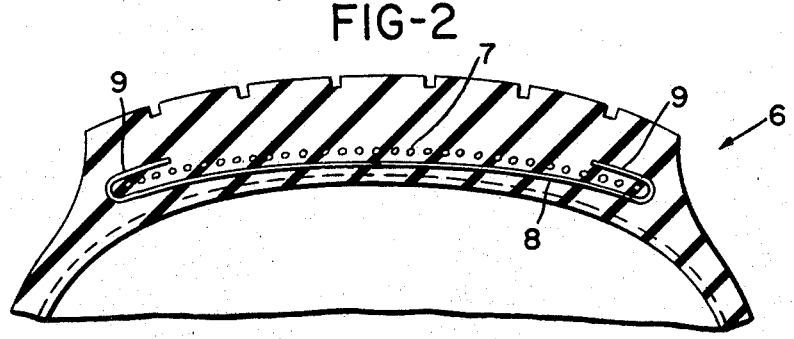
FIG. 2 is a partial section through a further embodiment of a pneumatic vehicle tire in accordance with the present invention.

The pneumatic vehicle tire 6, in radial construction with a differently embodied belt-like reinforcement according to FIG. 2, includes a reinforcement which comprises radially superimposed cord plies, the radially inner ply 8 of which comprises non-metallic cord elements. This ply 8 is folded around a further steel cord ply 7, with the thus formed turnovers or folded-over portions 9 essentially enclosing the steel cord layer 7.

Figure 3:
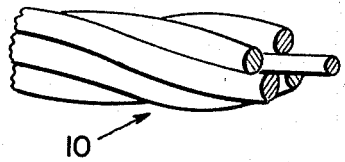
FIG. 3 shows a detail of a part of a cord element used with a pneumatic vehicle tire in accordance with the present invention.

The cord layer or layers 5, and the cord layer 7, comprise rubberized steel cord elements 10, a part of one of which is illustrated in detail in FIG. 3. Shown is a steel cord element which comprises a core of a single wire filament and a mantle of several twisted single wire elements.

Figure 4:
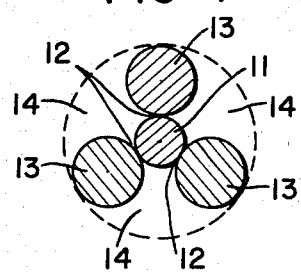
FIG. 4 shows a cross section through a cord element for a tire in accordance with the present invention.

Such a cord element is shown in cross section in FIG. 4. The mantle in this embodiment comprises three wire filaments 13 of equal size. The wire diameter ranges from between 0.15 mm to at most 0.28 mm. The center-to-center distance between adjacent mantle wire filaments is always greater than the diameter of the mantle wire 13. The inner core is one single wire filament 11, and its diameter is always smaller than that of a mantle wire filament. The core wire diameter has a cross section approximately 1.2 to 2 times smaller than that of the mantle wire diameter. The range is between 0.12 mm and 0.22 mm wire diameter. Each mantle wire filament 13 has a part 12 which radially engages the wire filament of the core. The remaining spaces or gaps 14 between the mantle wires and the core remain free. These gaps are filled in with a rubber mass or a rubber-like synthetic material during the further preparation and working of the cord elements into cord plies. In this connection, the actual so-called rubberizing or rubber coating of the cord elements occurs at the same time.

Figure 5:
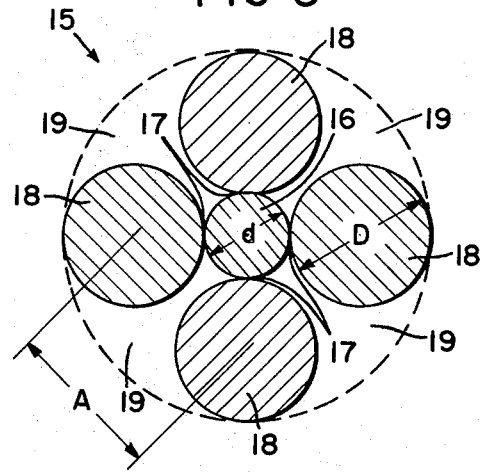
FIG. 5 shows a cross section through another cord element having features in accordance with the present invention.

FIG. 5 illustrates a further cord element 15 in cross section. The mantle comprises four single wire filaments 18 having a diameter D of preferably 0.22 mm to 0.25 mm. The inner core comprises one single wire filament 16 having a diameter d of preferably 0.12 mm to 0.22 mm. Each mantle wire has a radial support location 17 with respect to the inner core. Here too the center-to-center distance A between adjacent mantle wires is always greater than the diameter of the mantle wire filament. The spaces or gaps 19 are filled in with a coating mass during the further preparation or working of the cord elements into steel cord plies.

The wire construction or assembly of the cord element can preferably comprise up to five mantle wires with an inner core of a single wire filament. Steel cord plies comprising the described steel cord elements, because of the smaller number of wires necessary, have a comparatively low weight and are advantageous to produce from a cost standpoint. The steel cord plies contain cord elements which, because of their wire construction and dimensions, have sufficient strength to fulfill their function. The fatigue strength and compressive stiffness are particularly high. Furthermore, absolute air tightness of the steel cord elements exists because the inner core fills in the cord element center and because of a relatively thick or high rubberized coating. Selected wire construction at the indicated dimensions, and high coating, assure that if an essentially linear wire filament is used as the inner core, no shifting of the inner core occurs.

The high fatigue strength of the steel cord ply is also reliably assured during tire damage and the thereby penetrating air, which as a rule contains moist components.

All aforementioned characteristics and advantages are essential for the quality or efficiency of the belted tire. Particular significance is furthermore attributed to the fact that the steel cord plies, when used with belt plies having the described cord element construction, result in a very low rolling resistance of the pneumatic vehicle tire, and their high fatigue strength is assured without losses in wear or rubbing-off behavior. Low rolling resistance means less energy consumption, and high fatigue strength means long life or durability. In a time of great energy shortage and high production and operating costs, the application and utilization of the indicated cord elements in belt tires has great significance.

The present invention is, of course, in no way restricted to the specific disclosure of the specification and drawing, but also encompasses any modifications within the scope of the appended claims.

What we claim is:

1. A pneumatic vehicle tire which includes a carcass, beads, a tread, and a belt-like reinforcement located between said carcass and said tread, said reinforcement comprising at least two cord plies which are radially superimposed over one another, the width of at least one of said cord plies being approximately equal to the width of said tread, said cord plies comprising cord elements, with the cord elements of each ply extending at a given angle, the angles of the cord elements of adjacent cord plies being different, so that the cord elements of one ply cross those of an adjacent ply, the cord elements of at least one of said cord plies comprising rubberized metallic cord elements which respectively consists of a core of a single wire filament, and a mantle of at least three twisted single wire filaments of the same size and a diameter of at most 0.28 mm, each of said mantle wire filaments having a peripheral portion in contact with the periphery of said wire filament of said core, with the diameter of said wire filament of said core being less than the diameter of said mantle wire filaments, and the center-to-center distance of adjacent mantle wire filaments being greater than said diameter of said mantle wire filaments.

2. A pneumatic tire according to claim 1, in which the cord elements of one of said cord plies comprises non-metallic cord elements.

3. A pneumatic tire according to claim 1, in which said wire filaments are brass-plated steel wires.

4. A pneumatic tire according to claim 1, in which the cross section of said wire filament of said core is approximately 1.2 to 2 times smaller than the cross section of said mantle wire filaments.

5. A pneumatic tire according to claim 4, in which said mantle of said metallic cord element comprises four single wire filaments.

6. A pneumatic tire according to claim 4, in which said mantle of said metallic cord element comprises five single wire filaments.

7. A pneumatic tire according to claim 4, in which said single wire filament of said core of said cord element extends essentially linearly.

8. A pneumatic tire according to claim 4, in which said single wire filament of said core of said cord element extends curvilinearly.

* * * * *

UNITED STATES PATENT AND TRADEMARK OFFICE
CERTIFICATE OF CORRECTION

PATENT NO. : 4,328,852
DATED : 11 May 1982
INVENTOR(S) : DIONYSIUS JOSEF POQUE ET AL

It is certified that error appears in the above—identified patent and that said Letters Patent is hereby corrected as shown below:

On the Title Page, please correct the name of the Assignee as follows:

-- (73) Assignee: UNIROYAL ENGLEBERT Reifen GmbH,

Fed. Rep. of Germany --.

Signed and Sealed this

Twentieth Day of July 1982

[SEAL]

Attest:

GERALD J. MOSSINGHOFF

Attesting Officer     Commissioner of Patents and Trademarks